Figure 5:
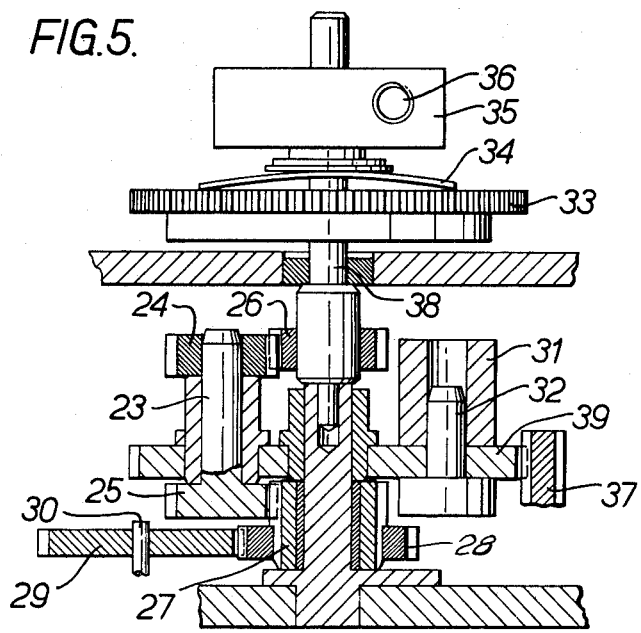

March 3, 1964 J. S. FRANKEL ETAL 3,123,752
SERVO SYSTEMS
Filed April 20, 1962 2 Sheets-Sheet 1
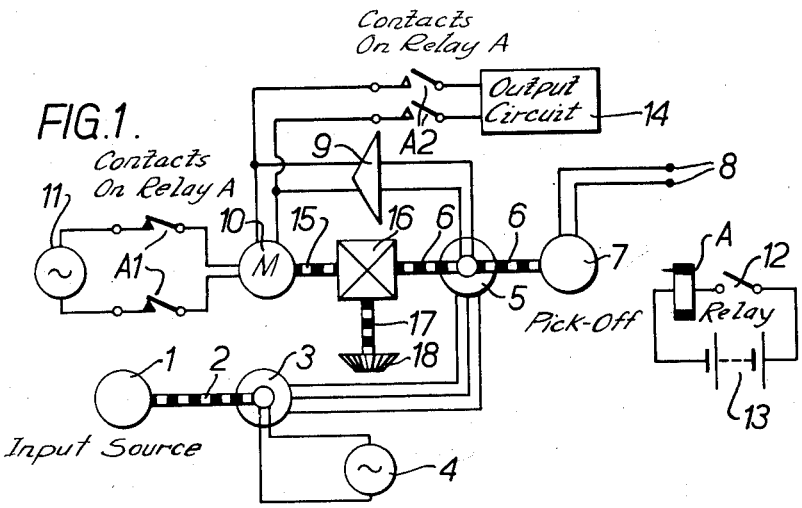
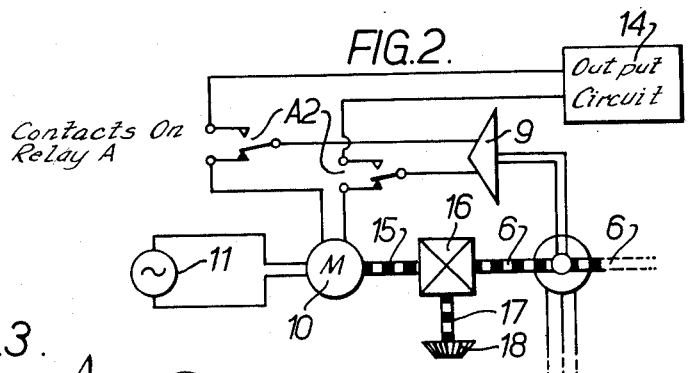
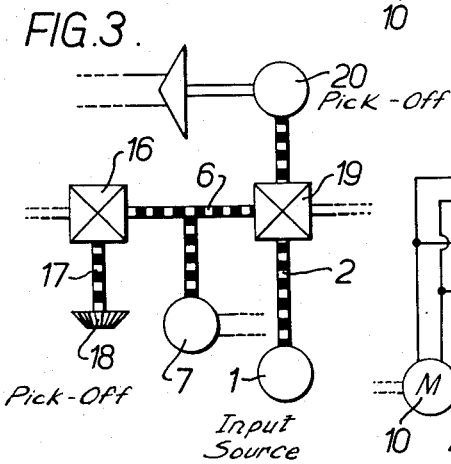
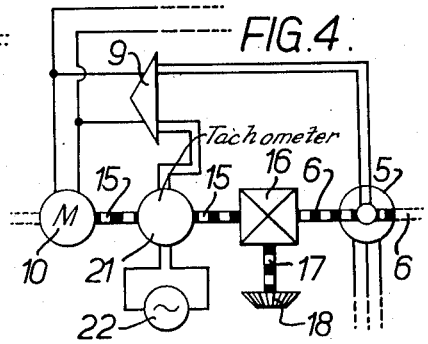
JOHN SEMON FRANKEL
HARRY HIRST INVS.
By Moore & Hall attys.

JOHN SEMON FRANKEL
HARRY HIRST   INVS.

United States Patent Office 3,123,752
Patented Mar. 3, 1964

3,123,752
SERVO SYSTEMS
John Semon Frankel and Harry Hirst, Basingstoke, England, assignors to S. Smith & Sons (England) Limited, London, England, a British company
Filed Apr. 20, 1962, Ser. No. 189,149
Claims priority, application Great Britain Apr. 21, 1961
14 Claims. (Cl. 318—18)

The present invention relates to servo systems and is concerned in particular with servo systems of the kind in which, in operation, an output member is normally positioned in dependence on the magnitude of an input signal and in which in addition there is provided means for breaking the servo loop at any desired moment, the system operating, after breakage of the loop, to provide an output signal which represents the difference between a datum value as set by the value of the input signal at the moment of breaking the loop and the actual value of the input signal at any subsequent time. Such servo systems will be referred to in this specification as servo systems of the kind specified.

The basic elements of a servo system of the kind specified comprise a servo motor and amplifier, the output of the latter being applied to the motor to control its operation, an output shaft driven by the motor, a signal input, means for generating a difference signal representing any difference between the actual position of the output shaft and the position demanded by the value of a signal applied to the signal input and means for applying the difference signal to the input of the amplifier. In addition there will be provided means for breaking the servo loop, for example by disconnecting the difference signal from the input to the amplifier or the output of the amplifier from the motor, and applying the difference signal to an output for the required output signal.

The various signals in a servo system of the kind specified may be of any convenient form, for example mechanical or electrical signals, and it is not necessary that the signals should all be of the same form throughout a given system.

Servo systems of the kind specified find application for example in control systems, such as automatic flight control systems for aircraft, where it is required to provide some device capable of receiving signals representing some quantity and to be able to switch the device at any selected instant to a mode in which there is generated a signal representing any deviation of the quantity from a datum value, determined by its value at the instant of switching. In an automatic flight control system for an aircraft, for example, there are provided modes of operation in which an automatic pilot operates to maintain some condition, e.g. indicated airspeed, Mach number, altitude (as measured barometrically) or pitch attitude, at the value subsisting at the instant of switching to the mode concerned. For this purpose, a signal representing any deviation of the quantity from the value at the moment of switching is needed to form at least a component of the demand signals applied to the appropriate channel(s) of the automatic pilot. Similar applications arise in other control systems where it is required to "lock" to some value of a variable input quantity.

Some difficulty arises in servo systems of the kind specified when there is an additional requirement that it shall be possible, subsequent to breaking the servo loop, to adjust the datum value relative to which the difference signal is generated.

According to the present invention a servo system of the kind specified is provided with a differential gear forming at least part of the coupling between the motor and the output shaft, the gear being arranged to permit a drive from a first input member which is coupled to the motor, to an output member which is coupled to the output shaft, and having a further input member from which a drive can be transmitted to the output member and which is coupled to a manually operable datum adjusting member.

According to a feature of the present invention there is provided apparatus comprising a plurality of servo systems of the kind specified each of which is provided with a differential gear forming at least part of the coupling between the motor and the output shaft, the gear being arranged to permit a drive from a first input member which is coupled to the motor, to an output member which is coupled to the output shaft, and having a further input member from which a drive can be transmitted to the output member, the further input members of all the differential gears being coupled to a common actuating member which is itself coupled to a manually operable datum adjusting member.

In any case, the differential gear and/or its associated elements must be arranged so that drives are transmitted only from the input members to the output member and not from one input member to the other.

Apparatus according to said feature of the present invention may be particularly useful, in for example automatic flight control systems for aircraft where a number of similar servo systems of the kind specified are provided, each requiring the provision of means permitting datum adjustment, but space and weight requirements demanding some economy of apparatus. Assuming that at any given time only one of the systems is operating in the mode in which the servo loop is broken, adjustment of the manual datum adjustment member will be effective in that system to adjust the datum in the usual way. In the remaining systems, however, the additional movement introduced by the movement of the datum adjusting member merely produces a temporary disturbace in the servo loop which is rapidly eliminated by the operation of the loop in the usual manner.

Examples of servo systems according to the present invention will now be described with reference to the accompanying drawings in which:

FIGURE 1 shows a schematic diagram of a simple electro-mechanical servo system,

FIGURE 2 shows a schematic diagram of a modification of part of the system shown in FIG. 1, FIGURE 3 shows a schematic diagram of a further modification of part of the system shown in FIGURE 1, FIGURE 4 shows a schematic diagram of a further modification of the system shown in FIG. 1, FIGURE 5 shows a cross section of a differential gear forming part of the systems of FIGURES 1-4 and FIGURE 6 shows a schematic diagram of three systems employing a common manually operable datum adjusting member.

Referring now to FIGURE 1 of the drawings, the system is shown coupled to a source 1 of input signals which controls an input shaft 2 to take up an angular position representing at any instant the magnitude of a quantity which is represented by the input signals. The shaft 2 drives the rotor of a synchro transmitter 3, which is energised by a suitable A.C. voltage source 4. The windings of the stator of the transmitter 3 are connected in parallel with the stator windings of a synchro control transformer 5, the rotor of which is positioned by the output shaft 6 of the system. The shaft 6 drives the moving part of a pick-off 7 providing an output signal across the terminals 8 which, in operation, represents the position of the shaft 6. The pick-off 7 may for example be a potentiometer or a synchro and, if required, more than one pick-off may be provided.

The rotor winding of the transformer 5 is connected to the input of a servo amplifier 9 the output of which is connected to the control winding of a two phase induction servo motor 10. The reference phase of the motor 10 is connected through a pair of normally closed relay contacts A1 of a relay A to a suitably phased A.C. voltage source 11. The winding of relay A is connected in a separate energising circuit which is shown on the right of FIGURE 1, in series with a manually operable switch 12 across a D.C. voltage source 13. In addition, the output of amplifier 9 is connected through contacts A2 which are normally open, of relay A to an output circuit 14.

The shaft 15 of the motor 10 drives one input member of a differential gear 16, the other input member of which is driven by a shaft 17 connected to a manually operable datum adjusting knob 18. The output member of the differential 16 drives the output shaft 6 of the system.

In the condition shown in FIGURE 1 with the switch 12 open, relay A thus not being energised and its contacts A1 and A2 being closed and open respectively, the system operates as a conventional position servo system, the movements of the output shaft 6 following those of the input shaft 2. Movement of the knob 18, when this condition holds, is ineffective apart from causing a temporary disturbance of the servo loop which is rapidly eliminated in the normal manner.

Briefly, the operation in this condition is that the synchro transmitter 3 transmits to the stator of control transformer 5 a signal representing the position of the input shaft 2. Any misalignment of the shaft 6 from the position corresponding to that of shaft 2 will result in the generation of a difference signal in the rotor winding proportional to the magnitude of the misalignment. This is amplified by the amplifier 9 and applied to the control phase of the motor 10 to cause it to reposition the shaft 15 and, through the differential 16, the shaft 6 in the sense required to reduce the difference signal towards zero. No signal is applied to the output circuit 14 but a signal representing the position of the shaft 6, i.e. the input signal, appears at the terminals 8.

If now switch 12 is closed and relay A energised, the servo loop is broken since contacts A1 open and de-energise the control phase of the motor 10. The position of the shaft 15 and the shaft 6 also, if there is no movement of the knob 18, is thus frozen and corresponds to the value of the input signal at the moment of closing the switch 12. If, subsequently, the input signal varies, a difference signal will still be generated in the rotor of synchro control transformer 5 and passed to the input of the amplifier 9. Since the contacts A2 are now closed, this difference signal is passed to the output circuit 14 and represents any departure of the input signal from a datum value set by its own value at the moment of closing the switch 12. If any adjustment of the datum value is required, the knob 18 is rotated to change the position of the rotor of the synchro control transformer 5 through shaft 17, differential 16 and shaft 6. The signal passed to the output circuit 14 will thereafter represent any deviation of the input signal from the adjusted datum value. In this condition of the system the signal produced at the terminals 8 will represent the datum value, either as originally determined or as varied by adjustment of the knob 18.

It will be appreciated that, the elements of the system shown in FIGURE 1 may be varied as required in particular circumstances. The basic essentials being in a differential (in FIGURE 1 this is the control transformer 5) for generating a difference signal representing the difference between an input signal and a similar signal representing the position of an output shaft, a servo amplifier to which the difference signal is applied and which controls a servo motor which drives the output shaft through a mechanical differential having a second input coupled to a manual adjustment member. Further, there must be some means (the relay A and its contacts in FIGURE 1) of breaking the servo loop and applying the difference signal to a separate pair of output terminals. In particular, the input signals may be other than mechanical, for example, electrical or pneumatic and, where they are electrical, the source may be coupled directly to some form of differential part of which is driven by the output shaft 6.

One possible variation is shown in FIGURE 2 which shows only the relevant parts of the modified system and employs the same references as in FIGURE 1, the remaining parts being as in FIGURE 1. Here, the means for breaking the servo loop are different. The contacts A1 are omitted, the reference phase of the motor 10 being connected permanently to the source 11. The contacts A2 are changed to changeover contacts which, when relay A is not energised, connect the output of the amplifier 9 to the control phase of the motor 10. When the relay A is energised, however, the contacts A2 change over and break the servo loop whilst connecting the output of amplifier 9 to the output circuit 14, as before. In a further modification the change over contacts could be connected between the input of amplifier 9 and the rotor of control transformer 5, connecting the latter to the output circuit 14 when the loop is broken.

In either system, the drives from the motor 10 and the knob 18 to the differential 16 need not be direct and may, particularly in the case of the drive from the motor 10 include reduction gears or other items, similarly the drive from the differential 16 to the rotor of control transformer 5 may include reduction gears or other items.

Further modifications are possible, too, in which the nature (i.e. mechanical, electrical, pneumatic etc.) of the different elements or signals is changed. Thus, for example, as shown in FIGURE 3, the control transformer may be replaced by a mechanical differential 19, one input of which is driven directly by the input shaft 2, the other being driven by the shaft 6. The output of the differential 19 drives an electrical pickoff 20 which generates a signal for application to the input of the amplifier 9. The remaining parts of the system, not shown in FIGURE 3, are as in FIGURE 1. Similar modifications to other elements are also possible.

If it is required to introduce a rate feed-back signal to provide in known manner damping of the servo system when the loop is not broken, the system of FIGURE 1 may be modified as shown in FIGURE 4 by the addition of a tachometer generator 21 which is driven by the shaft 15, is energised from an A.C. voltage source 22, and provides a signal representing the rate of rotation of the shaft 15 which is fed back to a second input of the amplifier 9 in known manner. Only the relevant parts of FIGURE 1 are shown in FIGURE 4, the remainder being as previously described.

In all these cases the differential 16 must be arranged so that it transmits drives from the shafts 15 and 17 to the shaft 6, but does not allow the shaft 17 to be driven in response to movement of the shaft 15 or vice versa. This can be arranged quite simply in known manner by providing that there is some resistance to movement of both the shafts 15 and 17, this will normally be provided by frictional forces, this resistance being greater than any resistance to movement of the shaft 6.

An example of a suitable differential gear is shown in cross section FIG. 5. This is a simple epicyclic differential gear having a first input shaft 37 (this would be, or be coupled to be, driven by the shaft 15 of FIGURE 1) and a second input shaft 38 (this would be, or be coupled to be, driven by the shaft 17 of FIGURE 1). The shaft 37 has a gear cut on its surface which engages with a pinion 39 forming the planet carrier of the differential gear. The pinion 39 carries a single planet shaft 23 having planet gears 24 and 25 mounted at either end of it, the shaft 23 being mounted for rotation about its own axis relative to the pinion 39. The planet gear 24 engages a sun gear 26 carried by the second input shaft 38 and the planet gear 25 engages a sun gear 27. The gear 27 is mounted for rotation with a pinion 28 which self engages a further pinion 29 mounted on the output shaft 30 (this would be, or be coupled to drive, shaft 6 of FIGURE 1). For balancing purposes, the pinion 39 carries a projection 31 and stud 32 positioned diametrically opposite the shaft 23.

As shown in FIGURE 5, the shaft 38 in fact carries a further pinion gear 33 enabling it to be coupled mechanically to a drive from a single shaft in common with similar gears of other servo systems, in the manner to be described below. For the purpose of ensuring that there is no "back-drive" from the input shaft 37 to the input shaft 38, a bowed spring washer 34 is compressed between one face (the upper one in FIGURE 5) of the gear 33 and a split collar 35 which is clamped to the shaft 38 by tightening of a screw 36. A similar arrangement could be provided on the input shaft 37 to prevent "back-drive" from the shaft 38 but in fact this shaft 37 is driven directly from the motor 10 and it has been found that some types of small servo motors have sufficient bearing friction effectively to prevent any back-drive occurring, provided that there is not a corresponding resistance to motion of the output shaft.

Where a number of systems of the kind specified are included in a single apparatus, space and weight saving requirements may make it inconvenient to provide a separate manually operable datum adjusting member for each system, since each system would require a separate mechanical link to its manual adjustment member which would have to be mounted externally, for example on a front panel of the apparatus.

Assuming for the moment that each system has a different input signal applied to it, provided that, at any given moment in operation only one of the systems will require to be operated in the condition in which the servo loop is broken and datum adjustment may be required, a single member may be provided for all the systems, this being coupled to drive the second inputs of all the differentials simultaneously. The effect of this is that, with only one system operating in the "broken-loop" condition, movement of the manual adjustment member will bring about datum adjustment in that one system in the usual way. In the remaining systems the adjustment has no material effect, since they will still operate with their servo loops closed and, as described previously, will merely eliminate the temporary disturbance caused by the drives imparted to the second inputs of their differentials. Further, the same arrangement may be employed even where two or more of the systems may be in the "broken-loop" condition at the same time provided that it is acceptable that any adjustment effected to change the datum of one will affect the datum of each of the other systems which are in the same condition. In practice this is only likely to arise where two or more of the systems are identical, for example supplying signals to different sub-channels of multiple channel servo systems having a plurality of nominally identical sub-channels the outputs of which actuate a common output member, or separate but like sections of an output device.

Figure 6:
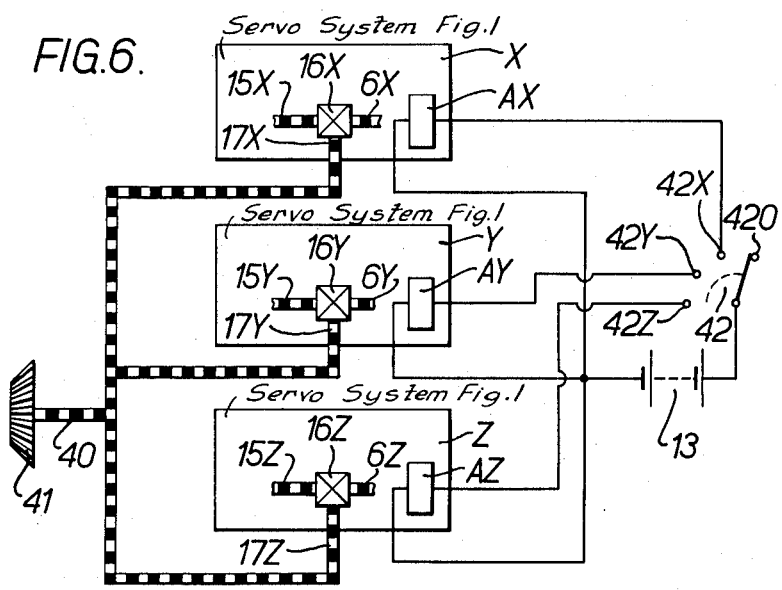

FIGURE 6 shows a block diagram of a case in which there are three servo systems of the kind specified X, Y and Z, indicated by the blocks referenced X, Y and Z in FIGURE 6. These will be assumed all to be as shown in FIGURE 1 but this is not necessarily the case, nor need the systems be identical with one another.

The three second input shafts 17X, 17Y and 17Z of the differentials 16X–Z are linked together mechanically (this is indicated only diagrammatically in FIGURE 6) to a common shaft 40 and a common manually operable datum adjustment knob 41. At the same time, the energising circuits for the relays AX, AY and AZ are interconnected, one side of the winding of each relay being connected together and to the negative side of a common D.C. supply source 13. The other sides of the relay windings are each connected to a different one of the contacts 42X, 42Y and 42Z of a four position selector switch 42, the fourth contact 42O of which is left unconnected. The moving contact of the switch 42 is connected to the positive side of the source 13.

When the moving contact of switch 42 is in contact with fixed contact 42O, none of the relays AX–Z will be energised and all three servo systems X–Z will be in the condition in which the servo loops are closed. As with the systems described with reference to FIGURES 1–4 any movement of the knob 41 will have no effect on the servo systems X–Z since all will eliminate the temporary disturbance in the usual manner. Movement of the switch 42 to any one of the positions in which it makes contact with one of the contacts 42X–Z (for example assume it to be contact 42X) the corresponding relay, in this case relay 4X will be energised. This will change the system X to the condition in which the loop is broken. Systems Y and Z will remain in the condition with the loop closed. Any subsequent movement of the knob 41 will then effect adjustment of the datum value in system X but will have no effect on the systems Y and Z which will, as before, eliminate the temporary disturbance caused by the movement of the knob 41.

If it is required that more than one servo system shall be placed in the "broken-loop" condition simultaneously, it is simple to rearrange the relay energising circuit so that the relays A of those systems are energised simultaneously, on selecting one of the switch positions. Then, movement of the knob 41 would cause adjustment of the datum value in the several servo systems together, whilst leaving those of which the relays are energised on selecting other positions of the switch, unaffected and operating in the "closed-loop" condition.

As previously mentioned, apparatus according to this feature of the present invention in which there are a plurality of servo systems of the kind specified having a common datum adjusting member may find application in automatic flight control systems for aircraft. For example, such a system may have provision for "I.A.S." and "Mach" lock modes of operation, that is to say, modes in which, through an automatic pilot included in the system, the aircraft is controlled to maintain flight either at the indicated air speed or at the Mach number subsisting at the moment of switching to the mode concerned.

To this end the flight control system would be supplied with signals from an air data computer, for example, such as that described in British patent specification No. 889,594, representing the aircraft's indicated air speed and Mach number, these signals being computed from measurements of the Pitot and static pressures. The signals may for example be in the form of synchro transmissions.

Each signal is applied to a separate synchro receiver the rotor of which positions a shaft in accordance with the magnitude of the quantity concerned, i.e. I.A.S. or Mach number. These shafts are the shafts 2, for example, of servo systems such as those described with reference to FIGURE 1. In each servo system, therefore, the output shafts 6 are positioned, while the servo loop is closed, in accordance with the aircraft's I.A.S. or Mach number. The I.A.S. servo system might, for example, be the system X of FIGURE 6 and the Mach number servo system, the system Y, system Z being omitted. The switch 42 of FIGURE 6 would then be a three position selector switch with one position in which neither lock is selected and two further positions for selecting one of the locks. When either is selected, signals would be supplied to the output circuit 14, which in this case would be computing circuits associated with the automatic pilot, from the selected servo system, these signals representing any departure of the input signal from its value at the moment of switching to the mode selected. The other servo system would continue to operate with the loop closed. If any "trimming" of either I.A.S. or Mach number is required whilst the mode concerned is in operation, this can be brought about by means of the knob 41, regardless of which lock is actually engaged.

While there have been described above what are presently believed to be the preferred forms of the invention, variations thereof will be obvious to those skilled in the art and all such changes and variations which fall within the spirit of the invention are intended to be covered by the generic terms in the appended claims, which are variably worded to that end.

We claim:

1. A servo system comprising a servo loop including a servo motor, a servo amplifier for controlling the operation of the motor and having a signal input and a signal output a differential gear having first and second input members and an output member, means for transmitting a drive from the motor to the first input member, an output shaft, means for transmitting a drive from the output member of the differential gear to the output shaft, a signal input for the system, a differential device for generating a difference signal representing the difference between two applied signals, means coupling the system signal input to the differential device to apply to it a signal representative of any signal applied to said input, means coupling the output shaft to the differential device to apply to it a signal representing the position of the output shaft, means for applying the difference signal to the amplifier input, switching means having switching contacts incorporated in the loop and having a first condition of operation in which said contacts close the loop and a second condition of operation in which said contacts effectively break the loop, a signal output, means operative under the control of said switching means in its second condition for applying a signal derived from said difference signal to the signal output, a manually operable adjusting member and means coupling said adjusting member to position the second input member of the differential gear.

2. A servo system according to claim 1 in which said differential device is a differential synchro having a fixed stator and a rotor mounted for rotation relative to the stator, the stator and rotor being respectively provided with stator and rotor windings, said coupling means to the system signal input comprising means for energising the stator winding in accordance with any signal applied to the signal input and said coupling means to the output shaft comprising a drive for positioning the rotor in accordance with the output shaft position, whereby the required difference signal is generated in the rotor winding.

3. A servo system according to claim 1 in which said switching means includes first switching contacts operative in said second condition to immobilise the servo motor and thus effectively to break the servo loop, and second switching contacts separately operative in said second condition to couple the signal output to receive said derived signal.

4. A servo system according to claim 1 in which said switching means has first switching contacts operative in said second condition to immobilise the servo motor and second switching contacts separately operative in said second condition to couple the signal output to the amplifier output.

5. A servo system according to claim 4 in which said switching means has first switching contacts operative in said second condition to immobilise the servo motor and second switching contacts separately operative in said second condition to couple the signal output to the amplifier input.

6. A servo system comprising a servo loop including an electric servo motor, an electric servo amplifier for controlling the operation of the motor and having at least one input and an output for electric signals, a differential gear having first and second input members and an output member, means for transmitting a drive from the motor to the first input member, an output shaft, means for transmitting a drive from the output member of the differential gear to the output shaft, a signal input for the system, a differential device having two signal inputs and a signal output and arranged to generate at the signal output an electric difference signal representing any difference between the magnitudes represented by signals applied to the two signal inputs, means for coupling the system signal input to one signal input of the differential device, means for applying a signal representing the position of the output shaft to the other signal input of the differential device, means for applying the difference signal to said amplifier input, switching means having switching contacts incorporated in the loop and having a first condition of operation in which said contacts close the loop and a second condition of operation in which said contacts effectively break the loop, a signal output for the system, means operative under the control of said switching means in its second condition for applying said difference signal to the signal output of the system, a manually operable adjustable member and means coupling said adjustable member to position the second input member of the differential gear.

7. A servo system according to claim 6 in which the servo motor is a two phase motor having a control phase winding and a reference phase winding and there is further provided a source of reference voltage for energising the reference phase winding, and electric connections between said source and the reference phase winding, the switching means having first switching contacts included in said connections and arranged to complete them in the first condition and to break them in the second condition.

8. A servo system according to claim 7 in which said switching means has second switching contacts and the system further includes means for coupling the amplifier output to the signal output of the system, said coupling means including said second switching contacts which operate to provide an effective coupling only when the switching means is in its second condition.

9. A servo system according to claim 7 in which said switching means comprises a changeover switch connected between the amplifier output, the motor and the signal output of the system, said changeover switch operating in the first condition to connect the amplifier output to the motor and in the second condition to connect the amplifier output to the signal output of the system.

10. Servo apparatus including a plurality of servo systems each comprising a servo loop including a servo motor, a servo amplifier for controlling the operation of the motor and having a signal input and a signal output, a differential gear having first and second input members and an output member, means for transmitting a drive from the motor to the first input member, an output shaft, means for transmitting a drive from the output member of the differential gear to the output shaft, a signal input for the system, a differential device for providing a signal dependent upon the difference between the actual angular position of the output shaft and an angular position represented by an input signal applied to said signal input of the system, first switching contacts incorporated in the loop and having a first position in which they close the loop, and a second position in which the loop is effectively broken, a signal output of the system, and means operative when the first switching contacts are in their second position to apply a signal derived from the difference signal to the signal output of the system and a drive for adjusting the position of the second input member of the differential gear, the apparatus including a switching circuit common to all the servo systems for controlling the operation of the positions of the first switching contacts and a common manually operable adjusting member coupled to all said drives to adjust the second input members of the differential gears of all the systems simultaneously.

11. Servo apparatus according to claim 10 in which each servo system includes an electric relay for controlling the position of the first switching contacts to take their first and second position in response to the energised and unenergised conditions of the relay and the common switching circuit includes a voltage source capable of energising said relays, a multi-position switch, and circuit means interconnecting said source, the multi-position switch and the electric relays whereby at least one relay is energised at each of a number of positions of the switch.

12. Servo apparatus according to claim 11 in which only one relay is energised at each of said switch positions.

13. Servo apparatus including a plurality of servo systems each comprising a servo loop including a servo motor, a servo amplifier for controlling the operation of the motor and having a signal input and a signal output, a differential gear having first and second input members and an output member, means for transmitting a drive from the motor to the first input member, an output shaft, means for transmitting a drive from the output member of the differential gear to the output shaft, a signal input for the system, a differential device for providing a signal dependent upon the difference between the actual angular position of the output shaft and an angular position represented by an input signal applied to said signal input of the system, first switching contacts incorporated in the loop and having a first position in which they close the loop and a second position in which the loop is effectively broken, a signal output of the servo system, second switching contacts having first and second operating positions, circuit means for applying a signal derived from the difference signal to the signal output of the servo system, said circuit means including the second switching contacts and being effective only in the second position of the second switching contacts, a relay having energised and de-energised conditions, the relay controlling the positions of the first and second switching contacts to be in their first and second positions respectively in response to the energised and de-energised conditions of the relay, and a drive for adjusting the position of the second input member of the differential gear, the system having a common switching circuit for controlling the conditions of all the relays and a common manually adjustable member coupled to all said drives to adjust the position of all the second input members of the differential gears simultaneously.

14. Servo apparatus according to claim 13 in which said common switching circuit comprises a source of energising voltage having first and second terminals, means connecting the first terminal to all the relays, a multi-position switch having a moving contact and a plurality of fixed contacts, means connecting the second terminal of the source to the moving contact, and means connecting each relay to one of the fixed contacts of the switch.

No references cited.